Feb. 20, 1940.  M. W. SEYMOUR  2,191,036
TRANSPARENCY CARRIER
Filed Sept. 14, 1938
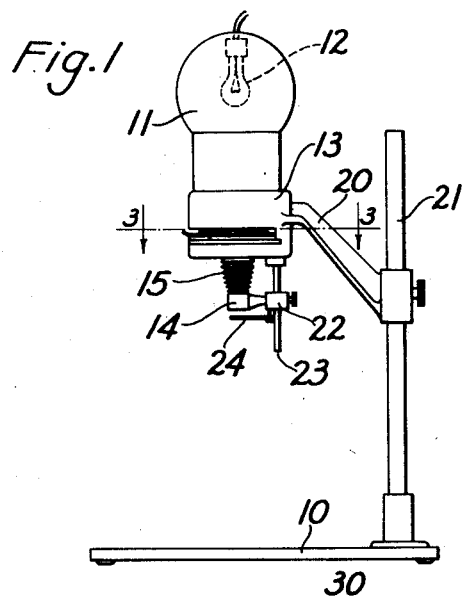
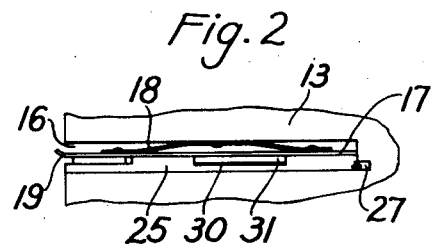
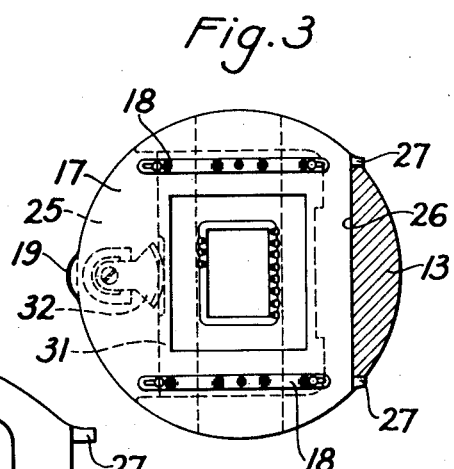
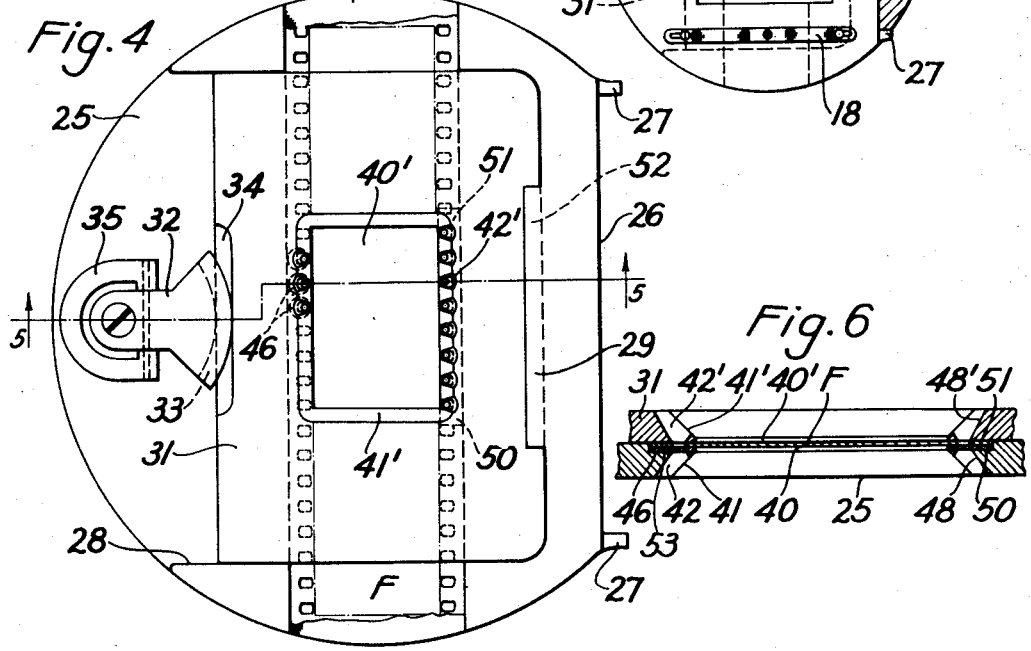
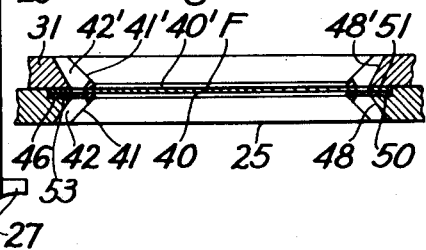
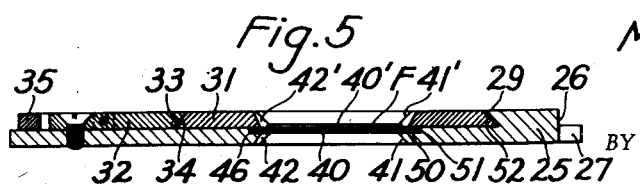
Merrill W. Seymour
INVENTOR
BY
ATTORNEYS Patented Feb. 20, 1940

2,191,036

UNITED STATES PATENT OFFICE 2,191,036

TRANSPARENCY CARRIER

Merrill W. Seymour, Rochester, N. Y., assignor to Eastman Kodak Company, Rochester, N. Y., a corporation of New Jersey Application September 14, 1938, Serial No. 229,909

8 Claims. (Cl. 88—24)

The present invention relates to enlargers, and particularly to a transparency carrier for use therewith, which carrier is particularly adapted for use in making color separation negatives, a step in a well-known process of making either three-color transparencies or three-color prints on paper from a colored transparency.

The process above referred to consists of making either three-color transparencies or three-color prints on paper from color separation negatives. These negatives may be exposed directly from the subject, or may be obtained from a color transparency. Inasmuch as the transparency carrier is adapted for use in making color prints from color transparencies, the major steps in the production of a color print from a color transparency will be briefly outlined to show the application of the carrier. The first step in the production of a color print from a color transparency, and the only step in which the present carrier takes a part, is the making of the color separation negative from the transparency. This step comprises projecting the transparency onto a suitable film, and making a negative first by projecting the transparency through a red filter, then making another negative through a blue filter, and finally making one through a green filter. These negatives are then printed onto a special and well-known wash-off relief film, which when properly treated form three matrices which when properly dyed and superposed on a special paper give the final colored print.

Inasmuch as color transparencies are usually of the 35-mm. size, in order to make a good size finished print, i. e., 8 x 10, an enlargement of the color transparency is required. This enlargement usually takes place in the step of making the color separation negatives, and the transparency carrier constituting the present invention is designed to properly locate and hold the transparency during this enlarging projection.

To make satisfactory and true color prints the separation negatives must be exposed with due regard for the filter factor corresponding to the light source used. To control this a scale of grays, or a density scale as it is often referred to in the art, is projected with the transparency onto the film, and said density scale is located adjacent the transparency so that it may be later trimmed off the negative after it has served to indicate the relative density of the three negatives. This scale should be recorded in each of the three negatives in equal density and contrast, and if they are not, it is an indication that the respective exposures through the three different color filters were not correct. When this is accomplished, the negatives are said to be in "balance." The projected density scale on the negatives also serves to indicate proper control of the development time of the negative. For instance, the negative made through the blue filter is inherently low in contrast, so that compensation must be made by increasing the amount of development by about 50 per cent. This increased development has the further advantage of decreasing the factor through the blue filter. If the set of negatives is correctly exposed and developed, any given step on the density scale thereon should have the same density in each of the three negatives.

The above outlined process of making an enlarged color print from a 35-mm. color transparency forms no part of the present invention, but is briefly outlined to show the application and advantages of my novel transparent carrier, described in detail below, in carrying out this process.

One object of the present invention is to provide a transparency carrier for the purpose described which includes a density scale which is adapted to be projected with the transparency onto the film held on the enlarger easel. Another object is to provide a carrier having transparent colored portions which are adapted to give an indication on each developed color separation negative as to which color filter was in front of the enlarger lens when the exposure of that negative was made. And still another object is to arrange said density scale and colored portions so that they are projected through the color filter with but outside the picture area of the color transparency. And yet another object is to provide a carrier of the type described wherewith the color portions and the density scale are arr nged so as to be projected through the perforations along the margins of a 35-mm. transparency. And a further object is to provide a carrier of the type described which is simple to operate, effective in use, and cheap to manufacture.

Briefly, my transparency carrier comprises two separable plates between which the transparency to be copied is firmly held in a flat position, and which serves to hold the transparency in place in an enlarger. The carrier is provided with a density scale located adjacent the exposure aperture therein so that said scale is projected onto the film on the enlarger easel along with the transparency and through the color filter in position before the enlarger lens to give an exposure indication. The carrier is also provided with means for giving an indication on each developed color separation negative of which color filter was in front of the enlarger lens during its exposure.

The novel features that I consider characteristic of my invention are set forth with particularity in the appended claims. The invention, itself, however, both as to its organization and its method of operation, together with additional objects and advantages thereof, will best be understood from the following description of a specific embodiment when read in connection with the accompanying drawing in which, Fig. 1 is a side elevation of an enlarger with my novel transparency carrier positioned therein.

Fig. 2 is an enlarged detail of the work stage of the enlarger, showing how the carrier is held in place therein, Fig. 3 is a section taken on line 3—3 of Fig. 1, and showing how the carrier is located in the work stage of the enlarger, Fig. 4 is an enlarged top plan view of the transparency carrier removed from the enlarger.

Fig. 5 is a section taken substantially on line 5—5, of Fig. 4, and

Fig. 6 is that portion of Fig. 5 including the exposure aperture of the carrier, and enlarged to clearly show the relative positions of the transparency, density scale, and the color disks when a transparency is positioned in the carrier.

Like reference characters refer to corresponding parts throughout the drawing.

In Fig. 1 is shown one form of an enlarger which may be used for making enlarged color separation negatives, and with which my novel transparency carrier may be used. This enlarger includes a base 10 the top of which may be provided with any suitable and well-known means, not shown, for definitely locating the sensitive film or paper thereon onto which the transparency is to be projected, and this base will be referred to hereinafter as the easel. The enlarger head includes a lamphouse 11 in which is situated a lamp 12, and a cylindrical portion 13 to the bottom of which is fastened the lens 14 by an expansible bellows 15. The cylindrical portion of the enlarger head necessarily is provided with an opening extending from the lamphouse to the bellows in which is situated the necessary condensers, not shown, and through which the light rays from the lamp pass to the enlarger lens and through the transparency in position in the enlarger head. This cylindrical portion is provided with a slot 16 which constitutes the transparency carrier stage or work stage. The transparency carrier may be resiliently held in the slot 16 and against the bottom edge thereof by a plate 17 which is resiliently connected to the top of the slot 16 by bowed springs 18 to be normally forced transversely of the slot. Referring to Fig. 3, it will be noticed that the plate 17 is substantially circular in shape to conform to the shape of the transparency carrier, and may be manually raised by gripping the finger portion 19 thereon to facilitate insertion or removal of the transparency carrier from the slot 16. The desired enlargement is obtained in the usual way by adjusting the bracket 20 integral with the enlarger head vertically on the post 21 projecting upward from the base or easel 10. The focusing of the enlarger is accomplished by moving a collar 22 to which the lens is connected vertically on the post 23 depending from the bottom of the enlarger head. For making the described color separation negatives the enlarger may be provided with a filter holder 24 pivotally mounted to the collar 22 so that it can be swung into or out of alignment with the enlarger lens so that the beam projected by said lens will have to pass through the filter in the holder. Although the form of this filter holder 24 is not shown and is not essential to the invention, it might comprise an arcuate sector having the necessary filters, i. e., red, green, blue, in juxtaposition so that one after the other they can be brought into position by merely moving the holder about its pivot; or said holder could constitute a single filter holder in which the separate color filters can be interchangeably mounted one after the other.

Since the enlarger itself forms no part of the present invention, but the form shown is merely to show the application of the novel transparency carrier, no further description of the enlarger itself is deemed necessary.

Referring now to Figs. 4, 5, and 6, my novel transparency carrier comprises a base plate 25 substantially circular in shape and provided with a straight rear edge 26 at either end of which is located a projecting lug 27. The rear edge of the base plate 25 is purposely formed as shown to provide a means for definitely locating the carrier in the enlarger head. This will be apparent by inspection of Fig. 3, wherein the rear face of the slot 16 in the enlarger head is shown as being vertical to engage the straight edge 26 of the base plate, and the edges of the head at the rear of the slot are shown as milled off to be engaged by the lugs 27 on the base plate 25. This arrangement definitely locates the carrier as to movement laterally and rearwardly of the head when being inserted into the slot 16. Such locating means for the carrier is necessary because, in the making of three color separation negatives it is imperative that the transparency be maintained in the same position in the enlarger during the production of all three negatives, and if for any reason, such as the necessary removal of a speck of dirt, it should be found necessary to remove the carrier before all three negatives are made, this locating arrangement insures the proper reinsertion of the carrier into the slot 16.

The top surface of the base plate 25 is provided with a substantially rectangular recess 28 of one depth which extends from one, or the front edge, rearwardly of the base plate, and the two sides and the rear margins of this recess are well within the outside edge of the base plate. The rear edge of the recess 28 is provided with a beveled overhang 29, see Fig. 5, which serves to hold the top plate superposed on the base plate in surface contact therewith as will be fully described hereinafter. The base plate 25 is also provided with a recess 30 extending transversely of the carrier, which recess is made deeper than recess 28 by an amount equal to the thickness of the transparency F for which it serves as a seat. In the form shown, this carrier is adapted for use with transparencies taking the form of a perforated film strip, i. e., 35 or 16 mm., but it is to be understood that the same could be used with unperforated transparencies if desired.

The transparency F is firmly held in a flat condition when the cover plate 31, equal in thickness to the recess 28 in the base plate, is placed in said recess in surface contact with the base plate. The rear edge of the cover plate is provided with a beveled portion 52 arranged to engage the beveled overhang 29 on the base plate, which beveled surfaces are brought into engagement by introducing the rear edge of the cover plate under the overhang at an angle as will be readily understood. The cover plate is locked in position on the base plate and is forced tightly into surface contact therewith when the latch 32 pivoted to the base plate 25 is rotated so that the beveled portion 33 on the front edge thereof engages a beveled portion 34 on the front edge of the cover plate. The latch 32 is rotated by means of a handle 35 which is pivoted to the latch to fold down flush therewith when not being used, as shown, and the camming action introduced between the beveled portions 33 and 34 of the latch and cover plate, respectively, causes the cover plate to be firmly pressed into surface contact with the base plate to hold the transparency flat.

Referring now to Figs. 5 and 6, the base plate 25 is provided with an exposure aperture 40 which is situated in the recess 30, and which is equal in size only to the picture frame of the transparency so that the perforations of the transparency lie outside of said exposure aperture when the transparency is properly positioned thereover. That portion of base plate 25 immediately surrounding the exposure aperture 40 is beveled as indicated at 41, for the purpose hereinafter described. The cover plate 31 likewise is provided with an exposure aperture 40' which corresponds in size and shape to the exposure aperture 40 in the base plate, and which is adapted to be aligned with the exposure aperture 40 when the cover plate is properly positioned on the base plate in its transparency holding position. That portion of the cover plate 31 surrounding the exposure aperture 40' therein is beveled, as indicated at 41', in the same manner as is the base plate 25 and described above, see Figs. 5 and 6.

The beveled portions 41 and 41' at one longitudinal edge of the exposure apertures 40 and 40' in the base plate and cover plate respectively are provided with three countersunk openings 42 and 42', which openings are adapted to be in register when the two plates are properly superposed. These countersunk openings are so spaced from one another and relative to the exposure apertures 40 and 40' that they will register with the perforations along the edge of the transparency when said transparency is properly positioned over the exposure aperture 40 in the base plate. These countersunk openings are so located relative to the exposure apertures 40 and 40' in the carrier that when the carrier is positioned in the enlarger, the projected light beam will pass therethrough. In covering relation with each of the countersunk openings 42 in the base plate is a different colored transparent disk 53, and to remove these disks from the plane of the transparency they are seated in recesses 46 formed in the base plate 25 to a depth equal to the thickness of the disk. For use with the color print process outlined the color disk in one countersunk opening will be red, the disk over another opening will be green, and the third disk will be blue. Said color disks are provided so as to give an indication on each developed color separation negative as to which color filter was used in the beam from enlarger lens during the exposure of that negative without necessitating that the operator place any identification marks on the films. For instance, when the carrier is in position in the enlarger and no filter is before the lens of the enlarger, an image of the transparency in full color will be projected on the enlarger easel or the film thereon along with the three color dots, red, green, and blue, located outside of the image but at the margin thereof. Now as the red filter is swung into position in front of the enlarger lens to make the red separation negative, this filter will pass only the beam of light passing through the red colored disk and will cut out the green and blue beams. When the color separation negatives are developed, a black dot will appear on each negative in the position corresponding to the color disk passing light of the same color as the filter used to expose that negative, while the dots will remain clear, or nearly so, in the positions corresponding to the color disks of different color. Thus, when a black dot appears on the negative in the position of the image of the red disk, it indicates that the red filter was used before the enlarger lens for the exposure of that negative. When a black dot appears in the position of the image of the green disk, it indicates that the green filter was used, and when a black dot appears in the position of the image of the blue disk, it indicates that the blue filter was used.

The beveled portions 41 and 41' at the other longitudinal edge of the exposure apertures 40 and 40' in the base plate and cover plate, respectively, are provided with a plurality of countersunk openings 48 and 48' identical as to form with those located at the opposite side of the exposure apertures as previously described, which openings are adapted to be in register when the two plates are properly superposed. These countersunk openings are likewise so spaced relative to one another and relative to the exposure apertures 40 and 40' that they will register with the perforations along the edge of the transparency when said transparency is properly positioned over the exposure aperture 40 in the base plate 25. These openings 48 and 48' are so located relative to the exposure apertures that the light beam from the enlarger lamp will pass therethrough and be projected by the enlarger lens onto the easel at the margin of the projected image of the transparency. In a recess 50 in the base plate 25 surrounding the openings 48 is situated a density or gray scale 51, well known in the art and not shown in detail, and this density scale is projected onto the sensitive film on the easel through the color filter in position in front of the enlarger lens to give on each negative a density scale by means of which the exposure of the three negatives can be compared to determine whether the negatives are in "balance" or not. Since the density scale on each negative is projected through the filter through which the transparency itself is projected, it will give a proper indication of the density of the negative, and by comparing the density scale on each of the negatives with one another the operator can determine whether the density and contrast of the negatives are proper, and if not, just what correction in exposure or development is required.

The registering openings 42, 48, and 42' and 48' in the base plate 25 and the cover plate 31, respectively, are countersunk, as shown, rather than being formed with straight sides for two reasons. First, by countersinking these openings both from above and below, their most constricted portion comes in the plane of the film F upon which the enlarger lens is focused, and hence, sharp boundaries for the colored disk and for the various steps of the gray scale are projected onto the easel by the enlarging lens.

If the openings were made straight sided, on the other hand, the restricted path of light would be fairly long, equal to the thickness of the two plates, and the edges of the projected images thereof would appear blurred instead of sharp. Secondly, since the openings 42, 48, and 42' and 48' are not centered above the enlarging lens, but are placed toward the edges of the field, and since, therefore, the rays through these openings pass through the lens more or less obliquely, it follows that the countersinking of the openings prevents the vignetting of the images of the colored disks by the top edges of the openings 42' and 48' and the bottom edges of the openings 42 and 48 that would occur if the openings were straight sided and of a length equal to the thickness of the two plates.

Although the embodiment of the carrier disclosed has the openings for projecting the color dots and the density scale so located as to cooperate with the perforations of the transparency, it is pointed out that the invention is not limited to such an arrangement. Instead of the transparency being of the type having perforated edges, it is pointed out that a transparency having an unmarked margin might be used. In such a case the openings instead of being spaced from one another as shown, might take the form of a single elongated opening over which the three color dots and the density scale would be positioned. It will be understood by those skilled in the art, that if an unperforated transparency is used that the size thereof would have to be reduced so that the margin did not cover the color or density scale openings, or the border of the transparency would have to be notched to leave said openings unobstructed. This step is necessary particularly when considering the projection of the density scale, because if the light was projected through the margin of the transparency in addition to being projected through the density scale and filter, the projected image of the density scale would not give the correct indication of the exposure of the separate negatives. If a single elongated opening were used in place of the three shown for the color disks, a single sheet of a tricolored transparency having the different colored areas clearly demarcated could be positioned over the opening. The openings through which the density scale is projected could be a single elongated opening, because a density scale in itself has clearly demarcated areas which would be distinguishable in the projected image thereof.

From the above description it will be apparent that my novel transparency carrier is particularly adapted for making enlarged color separation negatives, a step in the process of making enlarged color prints from small color transparencies. It accomplishes this first, by providing means whereby the operator can tell from each separation negative what color filter was positioned before the enlarger lens in making said negative, and secondly, by providing a density scale which is so situated as to be projected onto the sensitive film along with the transparency through the same color filter and by the same light as the transparency itself. This density scale which then becomes a part of each of the color separation negatives serves, when compared with a similar scale on the other negatives, to indicate whether the three negatives have been properly exposed and developed, and if not, just what change in the exposure or development of the individual negatives is required.

This density scale being outside of the projected image is trimmed off after it has served its purpose.

Although I have shown and described certain specific embodiments of my invention, I am fully aware that many modifications thereof are possible. My invention therefore is not to be restricted except in so far as is necessitated by the prior art and by the spirit of the appended claims.

Having thus described my invention, what I declare is new and desire to secure by Letters Patent of the United States is:

1. A transparency carrier for use with a photographic enlarger and for holding a transparency having a plurality of perforations along one margin, and comprising a base plate having an exposure aperture therein over which a transparency to be projected is adapted to be positioned, a removable cover plate adapted to be placed on the base plate for holding the transparency flat, said cover plate provided with an exposure aperture, means for positioning said cover plate on the base plate whereby the apertures in the two are in alignment, that portion of each of said plates forming the margins of the exposure aperture therein being beveled away from the aperture to form beveled margins, means for positioning and locking said cover plate in position on the base plate and for forcing the same into surface contact therewith to press the transparency flat whereby the exposure aperture in the two are adapted to be in alignment, said base plate and the cover plate each provided with a plurality of openings in one beveled margin of the exposure aperture therein, which openings are adapted to be spaced from one another so as to be in registry with one another and the perforations along the margin of the transparency when the cover plate is positioned on the base plate, and different colored filters carried by one of said plates and positioned in covering relation with each of said openings therein.

2. A transparency carrier for use with a photographic enlarger and for holding a transparency having a plurality of perforations along one margin, and comprising a base plate having an exposure aperture therein over which a transparency to be projected is adapted to be positioned, a removable cover plate adapted to be placed on the base plate for holding the transparency flat, said cover plate provided with an exposure aperture, means for positioning said cover plate on the base plate whereby the apertures in the two are in alignment, that portion of each of said plates forming the margins of the exposure aperture therein being beveled away from the aperture to form beveled margins, means for positioning and locking said cover plate in position on the base plate and for forcing the same into surface contact therewith to press the transparency flat whereby the exposure aperture in the two are adapted to be in alignment, said base plate and the cover plate each provided with a plurality of openings in one beveled margin of the exposure aperture therein, which openings are adapted to be spaced from one another so as to be in registry with one another and the perforations along the margin of the transparency when the cover plate is positioned on the base plate, and a density scale carried by one of said plates and positioned in covering relation with said group of countersunk openings therein.

3. A transparency carrier for use with a photographic enlarger, and comprising a base plate having an exposure aperture therein over which a transparency to be projected is adapted to be positioned, a removable cover plate adapted to be placed on the base plate for holding the transparency flat, said cover plate provided with an exposure aperture, means for positioning said cover plate on the base plate whereby the apertures in the two are in alignment, means for locking said cover plate in position on the base plate and forcing the same into surface contact therewith to press the transparency flat, the base plate and the cover plate each provided with two openings located adjacent different margins of the exposure aperture therein, the two openings in one plate adapted to register with the two openings in the other plate when said plates are superposed, a multi-colored filter carried by one of said plates in covering relation with one of the openings therein, and a density scale carried by the same plate in covering relation with the other opening therein.

4. A transparency carrier for holding a transparency having perforations along two parallel edges, and comprising a base plate having an exposure aperture over which the transparency is adapted to be positioned, said exposure aperture being of a size and shape to take in the picture frame of the transparency but not the perforated edges thereof, a removable cover plate adapted to be superposed on the base plate for holding the transparency flat, said cover plate provided with an exposure aperture corresponding in shape and size to the exposure aperture in the base plate, means for positioning said cover plate on the base plate whereby the apertures in the two are in alignment, means for locking said cover plate in position on the base plate and forcing the same into surface contact therewith to press the transparency flat, said base plate provided with one elongated opening located adjacent one margin of the exposure aperture therein to be in alignment with the perforations in one margin of a transparency positioned over said aperture, and provided with a second elongated opening adjacent the opposite and parallel margin of the exposure aperture to be aligned with the perforations in the other margin of the transparency, said cover plate provided with a pair of openings corresponding in location relative to the exposure aperture with said openings in the base plate, whereby the openings in the plates and the perforations in the transparency are adapted to be in registry when the cover plate is superposed upon the base plate with a transparency properly located between the two, a multi-colored filter carried by one of said plates in covering relation with one of the openings therein, and a density scale carried by the same plate in covering relation with the other opening therein.

5. A transparency carrier for holding a transparency having perforations along two parallel edges, and comprising a base plate having an exposure aperture over which the transparency is adapted to be positioned, said exposure aperture being of a size and shape to take in the picture frame of the transparency but not the perforated edges thereof, a removable cover plate adapted to be superposed on the base plate for holding the transparency flat, said cover plate provided with an exposure aperture corresponding in shape and size to the exposure aperture in the base plate, means for positioning said cover plate on the base plate whereby the apertures in the two are in alignment, means for locking said cover plate in position on the base plate and forcing the same into surface contact therewith to press the transparency flat, said base plate and said cover plate each provided with a plurality of openings located adjacent one margin of the exposure aperture therein, and spaced from one another so as to be in registry with one another and the perforations along one edge of the transparency when the plates are superposed, a different color filter positioned on one of said plates in covering relation with each of said openings therein, said base plate and said cover plate each provided with a plurality of openings located adjacent the opposite margin of the exposure apertures therein, and spaced from one another so as to be in registry with one another and the perforations along the other edge of the transparency, and a density scale positioned on one of said plates in covering relation with said second mentioned group of openings.

6. A transparency carrier for holding a transparency having perforations along two parallel edges, and comprising a base plate having a recess the edges of which are adapted to engage the longitudinal edges of the transparency when the same is positioned therein, said base plate provided with an exposure aperture located in said recess and of a shape and size to take in the picture area of the transparency but not the perforated edges thereof, a cover plate adapted to be superposed on said base plate for holding the transparency flat, and provided with an exposure aperture corresponding in shape and size to the exposure aperture in the base plate, means for locating and locking said cover plate on the base plate, whereby the exposure apertures in the two will be in alignment and the cover plate will be pressed into surface contact with the base plate, said means including upstanding projections on the base plate and arranged to engage three edges of the cover plate, a beveled overhang on one of said projections for engaging a beveled surface on one edge of the cover plate, a latch member pivoted to the base plate opposite said beveled overhang, and including a beveled surface for engaging a complementary beveled surface on one edge of the cover plate, said base plate provided with one elongated opening located adjacent one margin of the exposure aperture therein to be in alignment with the perforations in one margin of a transparency positioned over said aperture, and provided with a second elongated opening adjacent the opposite and parallel margin of the exposure aperture to be aligned with the perforations in the other margin of the transparency, said cover plate provided with a pair of openings corresponding in location relative to the exposure aperture with said openings in the base plate, whereby the openings in the plates and the perforations in the transparency are in registry when the cover plate is superposed upon the base plate with a transparency properly located between the two, a multi-colored filter carried by one of said plates in covering relation with one of the openings therein, and a density scale carried by the same plate in covering relation with the other opening therein.

7. A transparency carrier for use with a photographic enlarger, and comprising a base plate having an exposure aperture therein over which the transparency to be projected is adapted to be positioned, a removable cover plate adapted to be superposed on said base plate for holding the transparency flat, said cover plate provided with an exposure aperture, that portion of each of said plates forming the margins of the exposure apertures therein being beveled away from the exposure apertures to form beveled margins, means for positioning and locking said cover plate on the base plate, whereby the exposure apertures in the two are in alignment, said base plate and cover plate each provided with two counter-sunk openings located in the beveled margins of the exposure apertures therein, the two openings in one plate adapted to register with the two openings in the other plate when said plates are properly superposed, a multi-colored filter carried by one of the plates in covering relation with one of the openings therein, and a density scale carried by the same plate in covering relation with the other opening therein.

8. A transparency carrier for holding a transparency having perforations along two parallel edges, and comprising a base plate having an exposure aperture over which the transparency is adapted to be positioned, said exposure aperture being of a size and shape to take in the picture frame of the transparency but not the perforated edges thereof, a removable cover plate adapted to be superposed on the base plate for holding the transparency flat, said cover plate provided with an exposure aperture corresponding in shape and size to the exposure aperture in the base plate, beveled margins surrounding the exposure apertures in said two plates, means for positioning said cover plate on the base plate whereby the apertures in the two are in alignment, means for locking said cover plate in position on the base plate and forcing the same into surface contact therewith to press the transparency flat, said base plate and said cover plate each provided with a plurality of counter-sunk openings in one beveled margin of the exposure aperture therein, and spaced from one another so as to be in registry with the perforations along one edge of the transparency when the plates are superposed, a different color filter positioned on one of said plates in covering relation with each of the openings therein, said base plate and said cover plate each provided with a plurality of counter-sunk openings located in the opposite beveled margins of the exposure apertures therein, and spaced from one another so as to be in registry with the perforations along the other edge of the transparency, and a density wedge positioned on one of said plates in covering relation with said second mentioned group of counter-sunk openings.

MERRILL W. SEYMOUR.